(12) United States Patent
Klucznik

(10) Patent No.: US 6,332,595 B1
(45) Date of Patent: Dec. 25, 2001

(54) SERVICE HOSE STANDS

(76) Inventor: John Klucznik, 4529 Bethlehem Pike, Telford, PA (US) 18969

( * ) Notice: Subject to any disclaimer, the term of this patent is extended or adjusted under 35 U.S.C. 154(b) by 0 days.

(21) Appl. No.: 09/537,282

(22) Filed: Mar. 29, 2000

(51) Int. Cl.[7] ............................................. A47G 29/00
(52) U.S. Cl. ............................ 248/87; 248/85; 248/80
(58) Field of Search ................................ 248/87, 80, 85, 248/530, 156

(56) References Cited

U.S. PATENT DOCUMENTS

| | | | |
|---|---|---|---|
| 1,520,840 | * 12/1924 | Murray | 264/336 |
| 1,831,306 | * 11/1931 | Kakimoto | 242/615.2 |
| 3,819,137 | * 6/1974 | Smith | 248/49 |
| 4,126,012 | * 11/1978 | Waller | 405/157 |
| 5,437,424 | * 8/1995 | Netz, Sr. | 248/49 |
| 5,785,457 | * 7/1998 | Thompson et al. | 405/172 |
| 6,120,209 | * 9/2000 | Evans | 405/43 |

* cited by examiner

*Primary Examiner*—Anita King
*Assistant Examiner*—Holly H. Sy
(74) *Attorney, Agent, or Firm*—Gregory J. Gore

(57) ABSTRACT

A stand which captively suspends service hosing above the ground so the housing does not contact sensitive areas along the terrain includes vertically extending legs which are inserted into the ground in order to hold the stands in an upright position. Side plates and cross-members create cradles for holding each of the hoses separately. The cross-members of the stands are equipped with roller means which facilitate the process of threading and pulling the hosing through the cradles of the stands. Two separate horizontal rollers are spaced vertically to support each hose individually. A series of stands of any desired number are selectively placed between and around sensitive shrubbery.

6 Claims, 1 Drawing Sheet

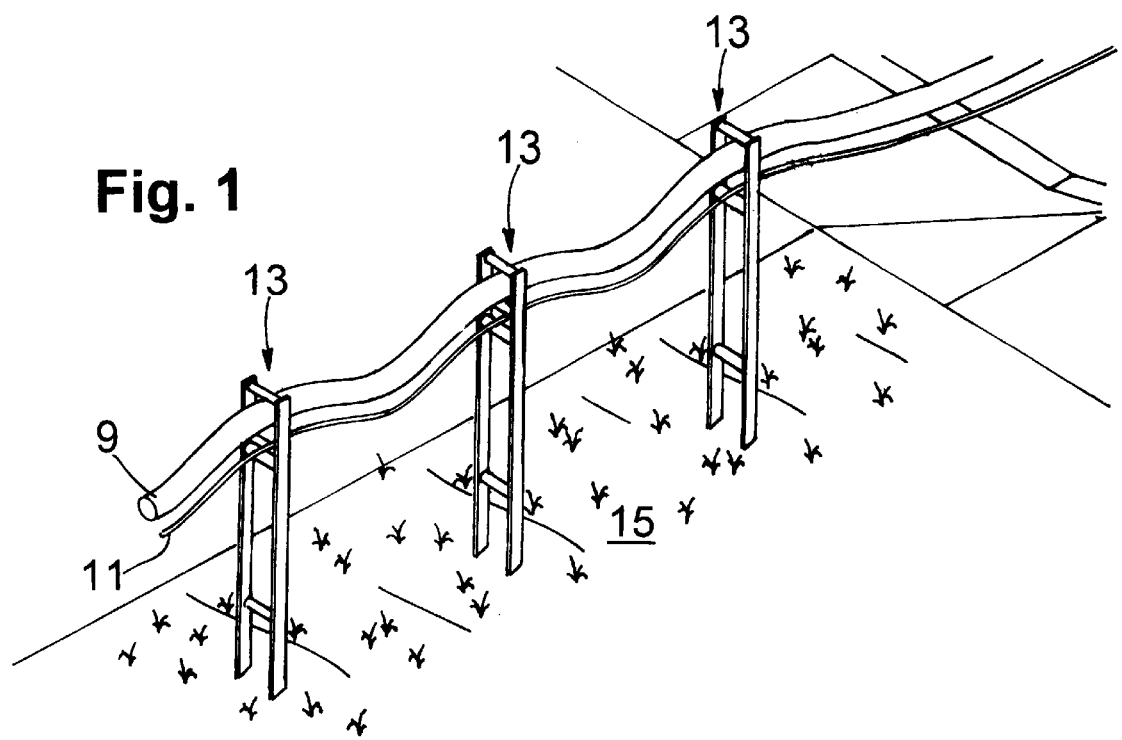

SERVICE HOSE STANDS

FIELD OF THE INVENTION

The present invention relates to supports for suspending flexible fluid conduits above the ground. More specifically, it relates to suspending hoses of the type used in service industries such as carpet and floor cleaning.

BACKGROUND OF THE INVENTION

Mobile service providers are becoming more prolific as the modern economy's need for greater personal services increases. Cleaning services are among those that are most demanded in both residential and commercial environments. Rather than bringing the cleaning equipment into the home or office, it has been found to be more efficient to utilize truck mounted cleaning machines with vacuum and liquid hosing brought into the building from the truck parked on the street. Heavy equipment provides the necessary power to transport the fluids through the long access lines.

There is a problem, however, in that the hosing which travels from the truck into the building usually lays along the ground, and in order to provide the shortest distance between the truck and the access site, it is often necessary for the hosing to travel over a terrain which includes delicate or sensitive objects, such as flower gardens or other landscaping. Because the hose lines associated with the cleaning services are heavy, and often need to be pulled along the ground, great damage can occur to expensive landscaping, shrubbery and plants. In addition to cleaning services, there is a general need to have hoses and other types of lines expended from the ground at building construction sites. Lines such as pneumatic air hoses and electrical cords also benefit from being suspended rather than laying along the ground. In this instance, it can be not only a matter of damaging the shrubbery and plants, but also keeping the hoses and lines from becoming entangled or from laying in mud and water which can cause short circuiting of electrical lines.

Solutions to this problem have included hose stands, however, these devices do not prove any provision for holding the hoses separate. When multiple hoses are employed, they are placed through the stands one at a time. When the second hose is pulled through, there is interference with the first hose contacting it. Furthermore, if the hoses are supported by a pulley, the pulley is held against rotation by the first hose resting on it and therefore the second hose receives no benefit from the friction-reducing capabilities of the pulley when it is pulled through.

There is therefore a need in the art to provide a safe and efficient means of routing service hoses directly into the building while avoiding any damage to the site. There is a further need in the art for a hose stand which extends multiple hoses separately with each being supported by a friction-reducing roller bearing which permits multiple hoses to be installed and removed from the stands easily and without any interference from other hoses.

SUMMARY OF THE INVENTION

In order to fulfill the above described need in the art, the present system has been more efficiently devised to captively suspend the service hosing above the ground so that it does not contact sensitive areas along the terrain which it must traverse. To accomplish this, the applicant has devised a stand system, which both cradles and suspends the hosing above the ground. The stands include vertically extended legs which may be inserted into the ground in order to hold the stands in an upright position. A series of stands are selectively placed between and around sensitive shrubbery and the service hose is threaded through the stands. Cross-members of the stands are equipped with rotatable pulleys which facilitate the process of threading and pulling through the hosing. Two separate horizontal pulleys spaced vertically, support each hose individually. This permits the hoses to be threaded through separately without interference with each other. Any number of stands may be used as required by a particular site.

Other objects of the present invention will be more readily appreciated from the following drawings and description of the preferred embodiment.

DESCRIPTION OF THE DRAWINGS

FIG. 1 shows a top, right front perspective view of the present invention shown being used to support service hoses above the terrain.

FIG. 2 is a top, right front perspective view of one of the hose stands of the present invention shown in isolation.

FIG. 3 is a side view of the present invention.

DESCRIPTION OF THE PREFERRED EMBODIMENT

Referring now to FIG. 1, hoses 9 and 11 are shown threaded through support stands 13. It is readily seen in this figure that the service hoses are suspended a comfortable distance above terrain 15, so that no damage may occur from contact with the hoses. As shown in this Figure, the upper hose 9 is very large in diameter and preferably carries air to the service truck as would normally be the case in vacuum cleaning operations. The lower hose 11 being of smaller diameter travels underneath the upper hose 9 threaded through a separate opening in each of the stands 13. Individual elements of the stands are more clearly depicted with regard to FIG. 2 which shows a single stand in isolation.

Referring now to FIG. 2, an individual support stand is shown in isolation. With reference to this Figure, each stand includes two vertically extending side plates 17 which are affixed together and held a spaced distance apart by horizontal cross-members 19. Cross-members 19 are equipped with rotatable pulleys which will be shown in more detail with regard to FIG. 3. Cross-member 23 is a foot crossbar and is positioned near the bottom and provides a convenient step for inserting the side legs 21 into the ground. Legs 21 extend below the foot bar 23 a suitable distance so that as the foot bar is pressed to the surface of the terrain the leg extensions will be driven a sufficient depth into the ground and provide sufficient support to the structure. Top crossbar 25 secures the side plates across the top to provide structural strength and to confine the upper hose as more clearly shown in FIG. 3.

Referring now to FIG. 3, a side view of the present invention shows the location of the cross-members along the length of the side plate 17. Pulleys 35 are clearly shown fitted about axles 37 which provide a fixed axle upon which the pulleys rotate. The stand provides captive spaces above the top pulley and below the top-most cross-member to receive a large diameter vacuum hose 9 (shown in phantom) and the smaller liquid-containing supply hose 11 (shown in phantom) threaded between the pulleys. Thus, both hoses are independently carried on bearing surfaces and are held separately from each other.

Thus, it will be readily appreciated that the object of the present invention to provide an economical and efficient means of avoiding terrain damage by suspending service hoses has been achieved. There may be other modifications and variations to the invention which will be readily obvious to those of skill in the art, however, the present invention should be limited only by the following claims and their legal equivalents.

What is claimed is:

1. The combination of a stand and fluid conduits providing suspension for said fluid conduits above a ground, comprising:

two vertically extending parallel side plates, said side plates rigidly affixed to each other and held in spaced relation by a plurality of cross-members affixed therebetween;

said cross-members including a top crossbar and a foot crossbar at the bottom;

each one of said side plates includes a leg extending vertically downward from said foot crossbar; and an upper hose held between a first cross-member and said top crossbar and a lower hose held between a second cross-member and said first cross-member.

2. The combination of claim 1, wherein said first cross-member and said second cross-member each further include roller means for supporting a weight of said upper hose and said lower hose separately.

3. The combination of claim 2, wherein said upper hose is an air hose and said lower hose is a liquid conduit.

4. The combination of claim 3 wherein said upper hose is a vacuum hose and said lower hose carries a cleaning solution.

5. A stand for suspending fluid conduits above a ground, comprising:

two vertically extending parallel side plates, said side plates rigidly affixed to each other and held in spaced relation by a plurality of cross-members affixed therebetween;

said cross-members including a top crossbar and a foot crossbar at the bottom; and each one of said side plates includes a leg extending vertically downward from said foot crossbar whereby said leg is driven into the ground by a foot pressure applied to said foot crossbar wherein a first cross-member and a second cross-member each further include roller means for separately supporting a weight of one of said fluid conduits.

6. The combination of claim 1, whereby said leg is driven into the ground by a foot pressure applied to said foot crossbar.

* * * * *